March 31, 1953 P. L. HUTCHINS 2,633,227
BELT
Filed Aug. 18, 1948
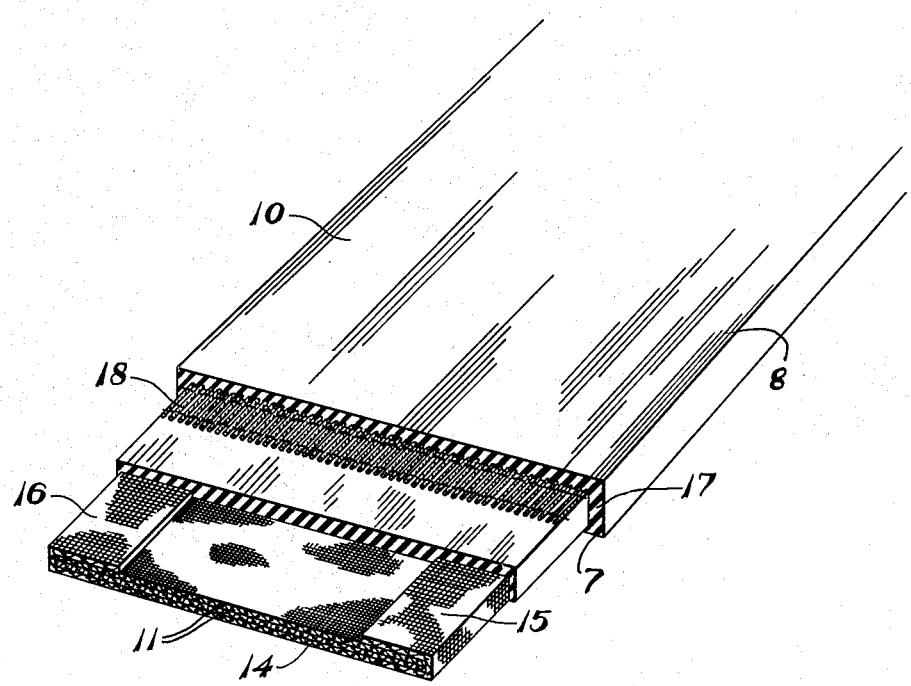
Inventor
Paul L-Hutchins
By
Att.

Patented Mar. 31, 1953

2,633,227

UNITED STATES PATENT OFFICE 2,633,227

BELT

Paul L. Hutchins, Cuyahoga Falls, Ohio, assignor to The B. F. Goodrich Company, New York, N. Y., a corporation of New York Application August 18, 1948, Serial No. 44,935

3 Claims. (Cl. 198—193)

This invention relates to flat belts for use on pulleys and is especially useful where belts are employed to handle hot materials or are otherwise exposed to high temperatures, although the invention is also useful in transmission belts, especially where such belts are exposed to high temperatures.

Where belts of rubber or other rubber-like materials having plies of reinforcing textile material such as straight laid woven fabrics or longitudinally disposed cords therein for resisting tensional forces have been used about pulleys the outermost plies of reinforcing material have been subjected to excessive loads due to bending of the belt while the portions of the belts adjacent the pulley faces have been subjected to compression by such bending. This has often resulted in breakage of the cords or longitudinal elements of the outer reinforcing layers especially in very thick belts. Sometimes the rubber wear face of the belt has also developed lateral cracks due to bending. The use of plies of tension resisting material of low extensibility throughout all of the plies has also resulted in providing a belt having high resistance to bending about the pulleys with resulting loss of power and heating of the belt due to bending.

Where flat belts of rubber or other rubber-like material have been employed to convey hot materials such as cinders, ashes, hot coke or cement clinkers having a temperature of 150 degrees Fahrenheit or greater, it has been found that the rubber-like material at the heated surface of the belt becomes oxidized rapidly resulting in loss of elasticity and pliability of the surface. As a result, the rubber-like material has developed laterally extending surface cracks due to bending of the belt around the pulleys. Such cracks have had the tendency to progress toward the fabric, cord or other tension-resisting material permitting particles of the conveyed material to enter the cracks and to contact the fabric or cords, causing separation of the cover therefrom in areas adjacent the cracks, and requiring the belt to be discarded long before the surface of rubber-like material has been worn away.

Objects of the invention are to overcome the foregoing and other difficulties by preventing progression of the lateral cracks to the tension-resisting textile body of the belt, to provide high stretchability of the textile material near the convexly bent face of the belt, to provide a heat-resistant elastic shield between the material-handling surface and the tension-resisting body of the belt, and to anchor the material-handling surface securely to the tension-resisting body while nevertheless preventing the progression of surface cracks.

These and other objects will appear from the following description and the accompanying drawings.

Of the drawings, the figure is a perspective view of a belt, partially stepped away in section and constructed in accordance with and embodying the invention.

Referring to the drawing, which shows a flat conveyor belt having opposite broad flat pulley-contacting and load-supporting faces 7 and 8 respectively, the tension-resisting body 10 near the pulley-contacting face of the belt comprises plies 11 of square-woven cotton belt duck coated with rubber or other rubber-like material and assembled in face-to-face relation in the region of the neutral bending axis of the belt, the layers being of the same width and extending substantially across the width of the belt. While it is preferred to employ cotton material for the tension-resisting body of the belt because of its high resistance to stretch and great strength, the body may be formed of fabrics of other materials such as metallic fabrics, or low stretch synthetic cellulose materials if desired. The tension-resisting body may also be of weftless cord or weak-wefted cord fabric if desired, or may be partly of such cord material and partly of woven fabric.

The tension-resisting body is at least partially enclosed by a layer of loose woven or other extensible open mesh tie cloth 14 which extends across the pulley side of the tension-resisting body and about the sides thereof overlapping the top ply at its margins as by overlapping margins 15, 16. This prevents separation of the plies of belt duck at their margins and assists in anchoring the cover of rubber-like material to the fabric body.

The cover material is of a heat-resisting rubber-like material having resistance to abrasion, and the desired hardness and elasticity and is applied completely about the upper face and side edges of the tension-resisting body as a thick layer. The cover material may also extend, of less thickness, over the pulley contacting face of the belt, to provide the cover 17. Below the material-supporting surface of the cover and over the tension-resisting body of the belt, and spaced from the neutral axis of the belt, a layer 18 of heat-resistant highly elastic and extensible cords, for example of a high moleclular weight linear polyamide such as polyhexamethylene adipamide, commonly known as nylon, is located in the rubber-like material of the cover with the cords extending lengthwise of the belt in spaced-apart relation so that the rubber-like material extends between the cords for anchoring together the rubber-like material of the cover thereabove to the material therebelow.

These longitudinally extending nylon cords 18 sustain tension, although because of their greater elasticity and extensibility than the body plies 11, the cords 18 yield to allow all or the greater part of the tension load to be taken by the plies 11. These cords 18 have the individual independency of their character as a cord layer, as distinguished from a woven layer, although for convenience of handling and building, this cord layer may have light widely spaced wefts as shown in the drawings.

Due to the high elasticity and extensibility of the nylon cords permitting stretch thereof under load, the belt is able to flex freely about its pulleys without breaking of the cords, whereas due to the high heat resistance of the cords they are not charred at the temperatures encountered in use of the belt as would be the case with less elastic or extensible cotton or similar materials not having resistance to damage by heat. This layer of cords provides a barrier which effectively prevents the progression of lateral cracks of the covering material past the cords throughout the life of the belt. As the cords are not charred or otherwise weakened by the presence of heated material or materially affected by moisture entering the cracks, the cord layer of nylon greatly lengthens the life of the belt and prevents separation of the cover from the tension-resisting body.

Belts having the tension-resisting material of low extensibility in the region of the neutral bending axis of the belt and more highly elastic and extensible material between a face of the belt and its neutral axis are readily flexed about pulleys with reduced loss of power due to friction of bending and more readily conform to the curvature of the pulleys providing high efficiency in transmission of power while the construction permits the manufacture of thick belts for conveying heavy material and reduces failures due to lateral cracking and presence of heat. Variations may be made without departing from the scope of the invention as it is defined by the following claims.

I claim:

1. A flat conveyor belt having a broad flat load-supporting face for carrying hot materials and an opposite broad flat pulley-contacting face, said belt comprising a layer of tension-resisting material extending longitudinally of the belt and located at the neutral axis of the belt for sustaining substantially the entire tension load on the belt, a covering body of heat-resistant resilient rubber material upon the tension-resisting layer for protecting it from contact with the hot material and from the pulleys, said covering body comprising between the load-supporting face thereof and the tension-resisting layer and spaced from the latter a continuous layer of cords extending longitudinally of the belt throughout its length so that by virtue of their longitudinal disposition said cords are effective to resist the progression of cracks developed in the load-supporting face of the belt across said cords, said cords having relatively high stretchability as compared to said tension-resisting layer so as to permit flexing of the belt about said neutral bending axis despite the spacing of said cords from said axis.

2. A flat conveyor belt having a broad flat load-supporting face for carrying hot materials and an opposite broad flat pulley-contacting face, said belt comprising a layer of tension-resisting material extending longitudinally of the belt and located at the neutral axis of the belt for sustaining substantially the entire tension load on the belt, a covering body of heat-resistant resilient rubber material upon the tension-resisting layer for protecting it from contact with the hot material and from the pulleys, said covering body comprising between the load-supporting face thereof and the tension-resisting layer and spaced from the latter a single continuous layer of independently-acting individual cords extending longitudinally of the belt throughout its length so that by virtue of their longitudinal disposition said cords are effective to resist the progression of cracks developed in the load-supporting face of the belt across said cords, said cords having relatively high stretchability as compared to said tension-resisting layer so as to permit flexing of the belt about said neutral bending axis despite the spacing of said cords from said axis.

3. A flat conveyor belt having a broad flat load-supporting face for carrying hot materials and an opposite broad flat pulley-contacting face, said belt comprising a layer of tension-resisting material extending longitudinally of the belt and located at the neutral axis of the belt for sustaining substantially the entire tension load on the belt, a covering body of heat-resistant resilient rubber material upon the tension-resisting layer for protecting it from contact with the hot material and from the pulleys, said covering body comprising between the load-supporting face thereof and the tension-resisting layer and spaced from the latter a continuous layer of independently-acting individual cords extending longitudinally of the belt throughout its length so that by virtue of their longitudinal disposition said cords are effective to resist the progression of cracks developed in the load-supporting face of the belt across said cords, said cords being of nylon having relatively high stretchability as compared to said tension-resisting layer so as to permit flexing of the belt about said neutral bending axis despite the spacing of said cords from said axis.

PAUL L. HUTCHINS.

REFERENCES CITED

The following references are of record in the file of this patent:

UNITED STATES PATENTS

| Number | Name | Date |
|---|---|---|
| 1,279,601 | Spadone | Sept. 24, 1918 |
| 1,920,482 | Toulmin, Jr. | Aug. 1, 1933 |
| 2,411,027 | Crosby | Nov. 12, 1946 |
| 2,444,903 | Van Buren | July 6, 1948 |
| 2,491,188 | Lesesne | Dec. 13, 1949 |

FOREIGN PATENTS

| Number | Country | Date |
|---|---|---|
| 521,117 | Great Britain | May 13, 1940 |